Jan. 19, 1960     F. M. MAYES     2,922,101
ELECTRICAL PROSPECTING METHOD AND APPARATUS
Filed Nov. 2, 1953     5 Sheets-Sheet 1
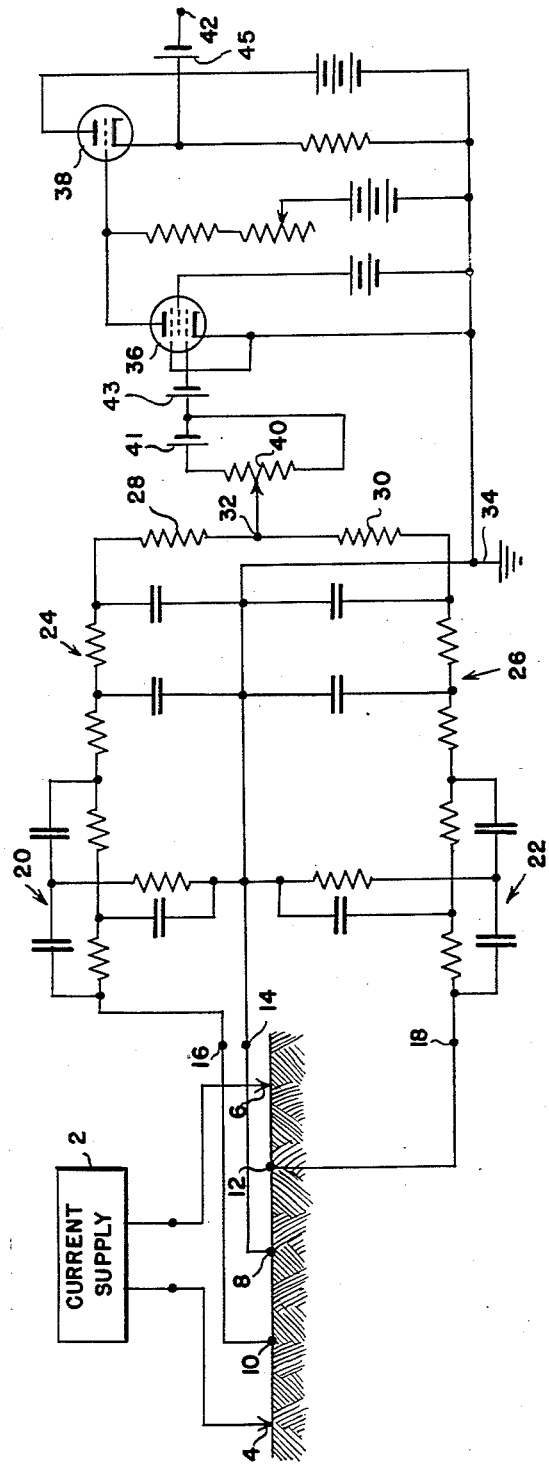
FIG. I.
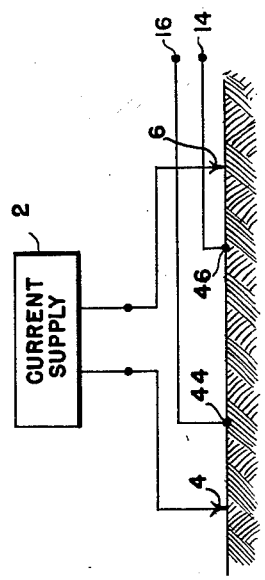
FIG. IA.
*INVENTOR.*
FRED M. MAYES
BY
ATTORNEYS

INVENTOR.
FRED M. MAYES
ATTORNEYS

INVENTOR.
FRED M. MAYES
BY
ATTORNEYS

INVENTOR.
FRED M. MAYES

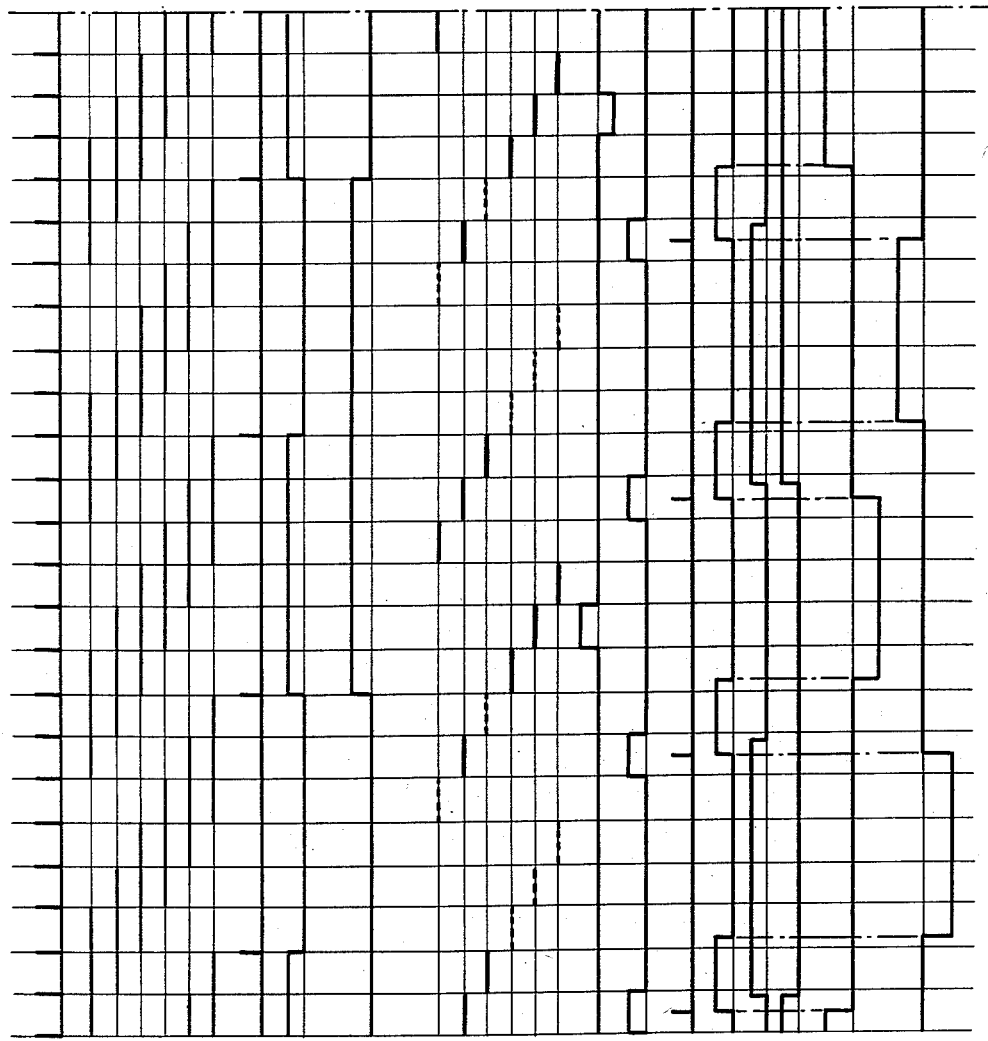

United States Patent Office 2,922,101
Patented Jan. 19, 1960

2,922,101

ELECTRICAL PROSPECTING METHOD AND APPARATUS

Fred M. Mayes, Newtown Square, Pa., assignor to Sun Oil Company, Philadelphia, Pa., a corporation of New Jersey Application November 2, 1953, Serial No. 389,729

26 Claims. (Cl. 324—1)

This invention relates to electrical prospecting methods and apparatus and has particular reference to prospecting involving the introduction of currents into the earth and the measurements of resulting potentials.

The present invention is quite generally applicable to electrical prospecting of the type just mentioned, but it is particularly applicable to electrical prospecting carried out in the fashions described in the application of Grace Davie Pearson, executrix of the estate of John M. Pearson, Serial No. 361,361, filed June 12, 1953, now abandoned, and my application Serial No. 361,314, filed June 12, 1953, now Patent No. 2,790,137. Reference may be made to said applications for more detailed discussion of the matter of measurement of transients delayed for substantial periods after their initiation, desirable electrode arrays, and other considerations. The general object of the present invention is to provide improved measuring means for use in electrical prospecting, the improvements involving in particular suppression of disturbing electrical "noise" which ordinarily represents a serious limitation on the measurements which may be made. In accordance with the invention, potential differences existing in the earth are measured in the form of measurement of a feedback current arranged to maintain equality between potentials at two points of a circuit which, aside from the feedback current, are produced by sampling corresponding portions of half cycles of the potentials in the earth resulting from reversed current flows. Differences in the potentials just mentioned which are to be maintained constant by the feedback serve to provide difference signals controlling the feedback current, the difference signals being subjected to amplification and a circuit which has an effective long time constant so as to give rise to the feedback current with major suppression of electrical noise signals. The feedback is desirable to minimize effects of drift of tube characteristics and changes in amplifier gain.

In accordance with the invention it is possible to maintain a potential electrode constantly at ground potential, a condition particularly desirable in making transient measurements.

Further objects of the invention relate to the sampling of transients produced in the earth at predetermined phases of cycles of introduced currents, and to the control of both the current and measuring cycles in such fashion as to secure accuracy. Electronic timing circuits are provided which are more flexible and subject to less maintenance than timers based on rotating contacts.

These and other objects of the invention particularly relating to details of construction and operation will become apparent from the following description, read in conjunction with the accompanying drawings, in which:

Figure 1 is a diagram showing an arrangement of current and potential electrodes on or adjacent to the surface of the earth and associated with filtering and preamplifying units;

Figure 1A is a diagram showing an alternative arrangement of electrodes;

Figure 5 is a diagram showing various phase relationships of events occurring in a cycle of operation.

Figure 2:
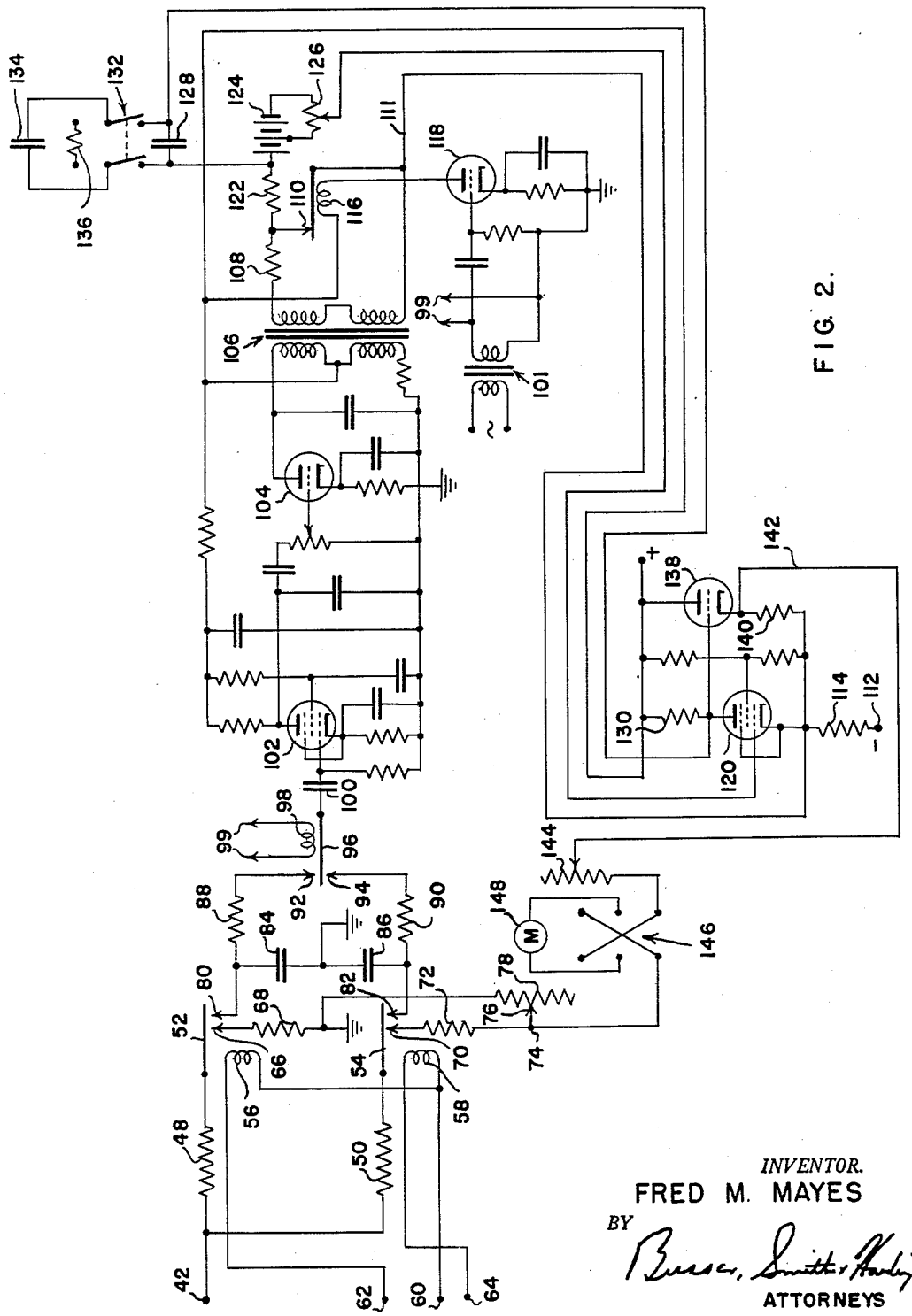
Figure 2 is a wiring diagram showing, in particular, the potential measuring means and the feedback producing devices mentioned above.

Referring first to Figure 1, there is indicated at 2 means for supplying current to the earth through a pair of electrodes 4 and 6. This current supplying means will be referred to hereafter in detail in connection with a description of Figure 4. At the present time, it will suffice to say that the supply means 2 provides a rectangular wave of current in the earth involving a flow of current in one direction for a predetermined period, an interruption of the flow for a second predetermined period, a flow of current in the reverse direction for a period having the duration of the first mentioned period, and a second interruption of current for the same period as the interruption first mentioned. This cycle is repeated at a suitable frequency for the measurements which it is desired to make, and the frequency of this cycle may be quite low for the purposes discussed in detail in the Pearson application and in my application referred to above. Potential measurements may be made selectively during either periods of flow of current or during periods of current interruption.

It may be here noted that instead of using a single current supply there may be provided a pair of current supplies, or even more than two such supplies, synchronized and properly related in their operation. Such use of a pair of current supplies is described in said Pearson application.

Potential electrodes 8, 10 and 12 are provided in accordance with Figure 1 to pick up earth potentials resulting from the current flow. These potential electrodes may be of conventional character and are desirably arranged, as illustrated in Figure 1, for the making of most types of measurements, i.e., with the center electrode 8 at the mid point between electrodes 4 and 6 and with the other potential electrodes 10 and 12 equally spaced at opposite sides of the electrode 8. With such an arrangement of the potential electrodes, which may be, though not necessarily, in the line of the electrodes 4 and 6, substantial suppression of the effects of stray earth currents may be secured as described in my application referred to above. It will, however, become obvious that the present invention is not specifically concerned with any particular electrode array, being useable with many arrays such as described, for example, in said Pearson application.

Considering specifically what is shown in Figure 1, the potential electrodes 8, 10 and 12 are respectively connected to the terminals 14, 16 and 18 of a filter network comprising the various filter sections 20, 22, 24 and 26 arranged symmetrically about the terminal 14. These filter sections are particularly designed to suppress such commercial electrical frequencies as may exist in the region in which measurements are being made, for example, the usual 60 cycle disturbances which are generally found in electrical prospecting in the United States. The symmetry of the filter arrangement is maintained through the high resistances 28 and 30 which are connected to a filter output terminal 32. The line running from central terminal 14 may be grounded, as indicated at 34. Terminal 32 is connected to the adjustable contact of a potentiometer 40 which is located across a battery 41 to provide suitable D.C. adjustment of the potential of the grid of an amplifying pentode 36, grid bias being further supplied by a battery 43. The pentode 36 is in a conventional amplifying circuit and its output is connected to the grid of a triode 38 arranged as a cathode follower with its output connected to a terminal 42 through a suitable D.C. potential adjusting battery 45. It will be noted that a D.C. amplifier is provided through the tubes 36 and 38. What has just been described provides a preamplifier giving rise, at terminal 42, to potentials as follows:

Assuming a part of a current cycle in which current flows from electrode 4 to electrode 6 through the earth, there will appear potentials between the potential electrodes either during the flow of current or after its cessation which will comprise between terminal 10 and terminal 8 and between terminal 12 and terminal 8 substantially opposing potentials. If the earth were uniform throughout the region affected by the current and giving rise to responses at the potential electrodes, these two potential differences would be equal and opposite, giving rise to a zero potential at terminal 32 with respect to the mean of the potentials at 10 and 12. However, if asymmetry exists in the earth, there will appear at 32 a potential with respect to said mean which is to be measured as an indication of the asymmetry. A stray current which is in the earth and is uniform in the region of the electrodes 8, 10 and 12, will give rise to equal and opposite potentials at 10 and 12 with respect to 8, and the effect of such stray current will not appear at 32.

If, now, the current introduced into the earth is reversed, the potentials of terminals 10 and 12 will also be reversed and the difference mentioned above as due to asymmetry in the earth will also be reversed so that this difference will appear at terminal 32 as a potential reversed from that appearing due to flow of current in the first mentioned direction. Again, uniform stray current in the earth will produce no potential at terminal 32. The potentials appearing at terminal 42 will correspond to those appearing at 32 but amplified. The signals which appear at 32 and have significance are, in general, very small compared to the potentials actually appearing between electrode 10 and electrode 8 or between electrode 12 and electrode 8 due either to the introduced current or to stray earth currents. It will be evident from what has been said, however, that these major potentials which are of no interest are greatly attenuated by the electrode and circuit arrangement described, while those small signals which are of significance are not so attenuated. It must be understood, however, that what has been mentioned is very considerably idealized, and actually the desired signals appearing at terminal 42 are generally minute. These signals are generally submerged in a great amount of background noise, and the measuring means about to be described has as its objective getting rid of the background noise in favor of the desired signals.

As an example of another type of electrode arrangement which may be used, there is illustrated in Figure 1A in conjunction with the current supply 2 and current electrodes 4 and 6 a pair of potential electrodes 44 and 46 which may be connected to the terminals 14 and 16 of the filter and preamplifier arrangement of Figure 1. (Desirably under these conditions the circuit is opened at the location of resistor 30 and the terminal 18 is grounded.) It will be evident that when such an arrangement of electrodes is used, significant signals may be very considerably submerged in background noise to an extent much greater than in the case of the electrode configuration first described. The signal-to-noise discriminating means which will now be described is, however, effective in making possible the use of this type of electrode configuration.

Referring now to Figure 2, the terminal 42 previously described is therein shown as connected to a pair of resistors 48 and 50 which are, in turn, connected to the relay armatures 52 and 54 arranged to be operated in alternation by energization of their coils 56 and 58 through the terminals 60, 62 and 64 which will be later described in connection with the timing mechanism. At the present time, for a general understanding of Figure 2, it may be mentioned that the relays operate alternately in corresponding phase relationships to the flows of current in forward and reverse directions from the current supply 2. By this it is not to be understood, however, that the relays are necessarily operated while the current is flowing, but rather that they operate to sample the potential signal at 42 at times which are related to the forward and reverse flows of current by reason of the setting up of transients in the earth due to such flows. A relay contact 66 arranged to be engaged by armature 52 is connected through resistor 68 to ground. A corresponding contact 70 arranged to be engaged by the relay armature 54 is connected to ground through resistor 72 and, through terminal 74, through the contact 76 of the rheostat 78. Resistors 48 and 50 are equal and resistors 68 and 72 are also equal and all of these have high resistance values. The resistance values involved in the rheostat 78 are, in comparison, quite low. The result is that for all practical purposes the resistances between contact points 66 and 70 to ground are equal.

Second contact points 80 and 82 engageable by the relay armatures 52 and 54 are respectively connected to the ungrounded terminals of high capacity condensers 84 and 86.

Considering Figure 2 to the extent so far described, and recalling that the sign of the signal appearing at terminal 42 will, in general, be (as to its variable portion) positive due to current flow in one direction and negative due to current flow in the opposite direction, and that the relays are energized in periods related to the respective current flows, it will be evident that condenser 84, if fully charged at one cycle, would be charged to a potential equal to a predetermined fraction of the potential of terminal 42 at the time of closure of the relay armature 52 and condenser 86 would be charged to an essentially equal but opposite potential during the closure of relay armature 54. At any rate, if the potential of terminal 42 remained the same for repeated cycles, such ultimate charging of the condensers 84 and 86 would result so that, if for simplicity we consider the resistances 48, 50, 68 and 72 to be all equal, and disregarding D.C. voltage at terminal 42, the potential difference between the ungrounded terminals of condensers 84 and 86 would be proportional to the potential, during one of the intervals, of terminal 42. The ideal conditions of absence of drifts and changes in amplifier gain which would make possible securing of results by merely measuring this potential difference are not attained in reality and condenser 86 is made to receive current sufficient to bring its ungrounded terminal to the same potential as the ungrounded terminal of condenser 84. This current is provided by a feedback arrangement which is responsive to the difference of potentials of the ungrounded terminals of the condensers.

The ungrounded terminals of the condensers are connected through resistances 88 and 90 to the contact points 92 and 94 of the armature 96 of a chopping relay having its coil 98 energized through connections 99 to a transformer 101 which may be energized by alternating current at any desired frequency. The armature 96 is connected through condenser 100 to the control grid of a pentode 102 which, together with a triode 104, is connected in a conventional two-stage amplifier circuit. The output is delivered through the transformer 106 and resistance 108 to the contact 110 of a second chopper relay the coil 116 of which is energized through a triode 118 the grid of which is controlled from the secondary of the transformer 101 which supplies voltage to the connections 99. The armature of this relay is connected to the line 111. Contact point 110 is connected through resistance 122 to an arrangement of a battery 124 and potentiometer 126 supplied for biasing to zero the Miller integrator which embodies the pentode 120 and its conventional connections. (Such an integrator is described in "Waveforms," Radiation Laboratory Series, McGraw-Hill, page 664.) The cathode of pentode 120 is connected through resistance 114 to a negative potential terminal 112. The junction between resistance 122 and battery 124 is connected through a condenser 128, which serves for reset purposes, to the anode of pentode 120. The anode of pentode 120 is connected to the positive potential supply line through resistance 130. A switch 132 serves to connect a condenser 134 either in parallel with condenser 128 or across a discharging resistance 136. During operation the condenser 134 is connected in parallel with condenser 128. Condensers 134 and 128, resistance 122 and the gain of tube 120 provide a large time constant for the integrator. The output of the integrator is delivered from its anode through a cathode follower arrangement of a triode 138 and cathode resistor 140 which returns to the cathode of pentode 120. From the cathode of triode 138 connection 142 runs to terminal 74 through variable resistor 144, reversing switch 146, and meter 148 which is desirably of a recording type. The variable resistor 144 provides a feedback control.

The circuit arrangement from the relay armature 96 back to terminal 74 serves to provide the high discrimination of the desired signal against background noise. The vibration of the relay armature 96 converts the difference of potential of the condensers 84 and 86 into a readily amplified alternating signal which, following its amplification, is synchronously rectified by the relay 116 to give a signal which is applied to the Miller integrator and which, in turn, provides a current through connection 142 to supply a potential at terminal 74 which will serve to reduce the difference in potential between the condensers 84 and 86 to zero. The Miller integrator in this case is not used for securing any integral in the sense of one desired to be measured, but merely serves to provide a filter having a long time constant. In fact, it could be replaced by such a filter but an equivalent filter would be both bulky and expensive and the arrangement involving the integrator is, therefore, to be desired particularly since the over-all time constant is reduced by the feedback loop. It may be validly assumed that disturbing signals will not have the period of the cycle of current introduced into the earth; as a consequence, they will, on the average, tend to cancel out and, therefore, if measurements are made over a number of current cycles, the result may be assumed to be quite free of disturbances. That the meter 148 under conditions of operation reads a current which is proportional to the desired signal will be evident from the fact that for a given setting of potentiometer contact 76 the current in the meter is proportional to the potential at point 74 which, averaged, together with the potential introduced through resistance 50 serves to make the potential of the ungrounded terminal of condenser 86 equal to that of condenser 84 the signals to which are derived through resistance 48.

Figure 3:
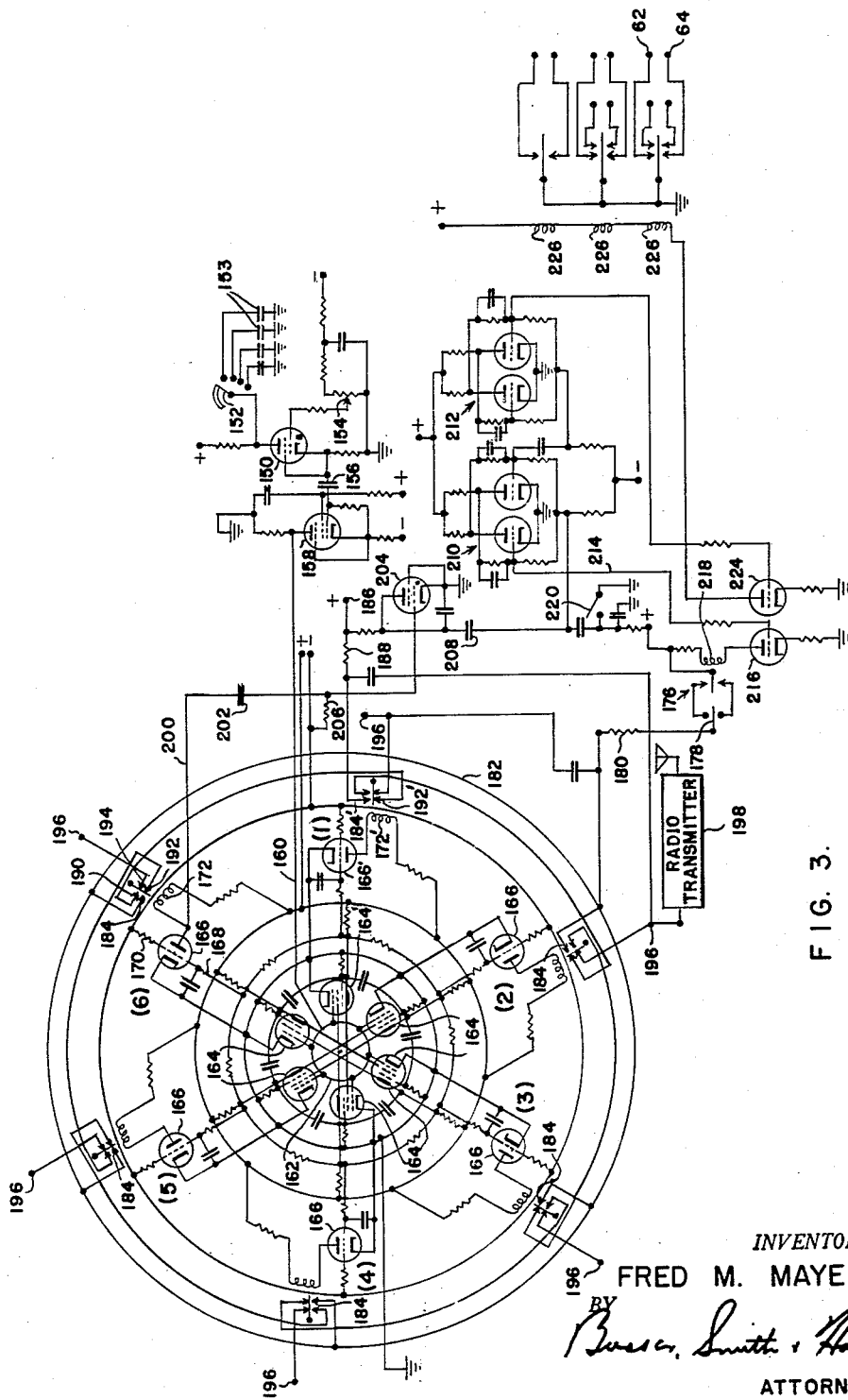
Figure 3 is a wiring diagram showing, in particular, cycle timing means for the measuring apparatus and for control of the initiation of earth current cycles.

There may now be considered the timing circuit of Figure 3 which controls the energization of relay coils 56 and 58 and also provides synchronizing signals for the current supply.

A thyratron 150 is in a conventional relaxation oscillator circuit of variable frequency type, the frequency being variable in steps by the switching of condensers 153 into the circuit by switch 152 and fine frequency variations being afforded by variation of the contact 154 of a bias potentiometer. Each discharge of the thyratron provides a positive pulse through condenser 156 to the control grid of a pentode amplifier 158 which delivers from its anode a corresponding negative pulse. As will shortly appear, each pulse marks 1/24 of a complete cycle of operation of the apparatus. The negative pulses from the anode of pentode 158 are delivered through connection 160 to the control grids of a system of pentodes 164 which with their interconnections provide a conventional ring scaling circuit of the type described on pages 185 to 189 of the Review of Scientific Instruments, volume 17, No. 5. It is a characteristic of this ring circuit that three of the tubes 164 always conduct and that the other three are not conducting. The three conducting tubes are adjacent, and upon the supplying of each negative pulse to the common grid connection 162, the conducting—non-conducting pattern advances one step around the ring in a clockwise direction, as pictured in Figure 3. For every six pulses, therefore, the ring circuit completes one cycle of its operation.

The anode of each of the pentodes 164 is connected to the grid of a corresponding triode 166 through a resistor 168, the grid of each of the triodes 166 being also connected through a resistor to a negative supply line. The effect of this connection is that a particular triode 166 will only conduct when the anode potential of its companion pentode 164 is high, i.e., when the latter is not conducting. Accordingly, the conducting—non-conducting pattern of the triodes 166 is opposite that of the pattern of the pentodes 164 and the pattern for tubes 166 also moves around one step clockwise for each pulse received through connection 160.

Each of the triodes 166 has a relay 172 in its anode circuit, the relays being connected to a common positive potential source. For convenience of reference, the triodes 166 and their associated relays are designated by the positions (1) to (6), inclusive. The relay contacts are designated in detail for the relay in position (6) and it will be noted that each comprises an armature which is arranged to engage and interconnect contacts 192 and 194 when in one position and engage and interconnect contacts 184 and 190 in its alternative position. It may be assumed that the relay armatures are normally in the position engaging contacts 192 and 194 when the relays are deenergized. Considering the various elements in positions (2) to (6), inclusive, it will be noted that the contact 184 of each is connected to a common conductor 182 which is, in turn, connected through a resistance 180 to the switch 178 which is movable to alternative positions to connect to either of the two contacts of a relay 176 having an energizing coil 218. The corresponding contact 184' of the relay in position (1), however, is connected directly through a resistance 188 to a positive potential supply terminal 186. Aside from this, the contacts of the relays are similar. Each contact point 194 is connected to an individual terminal 196. Each contact 190 is connected to the contact 192 (or 192') of the relay which is next to it in a clockwise direction. The result is that the terminal 196 in any position is given a positive potential only if the next counterclockwise relay is energized, and provided its contact point 184 is connected to a positive supply, either through 186 in the case of contact point 184', or through the switch arrangement at 178 which will be more fully referred to hereafter. In short, as the conducting—non-conducting pattern rotates about the ring, each terminal 196 will be energized for only one period between pulses on line 160, at most.

A radio transmitter 198 is energized from the terminal 196 in position (2). As will hereafter appear, this transmitter must emit a carrier once for every cycle of the ring, and this accounts for the special supply of positive potential to the contact 184' of the relay in position (1).

The anode of one of the triodes 166 is connected through a conductor 200 and condenser 202 to the control grid of a thyratron 204, which control grid is biased negatively through a resistor 206 connected to a negative potential supply terminal 207. The connection 200 may be to the anode of any one of the triodes 166 but is specifically illustrated as connected to the anode of the triode in position (6). The result of connection to one of the other anodes will merely be a change in phasing which, as will appear, is in any event immaterial.

Considering specifically the connections shown, the thyratron 204 will be fired whenever it receives a positive pulse through condenser 202, which pulse will result when the triode to which connection is made becomes non-conductive. The thyratron 204, accordingly, fires once for each cycle of the ring. Upon each firing, a negative pulse is emitted from its anode through condenser 208 and this is delivered to a first scaling stage 210 of conventional type comprising a pair of triodes conventionally connected so that when one is conducting the other is non-conducting, and vice versa. Negative pulses are delivered from this first scaling stage to a second similar conventional scaling stage 212 which also comprises a pair of triodes alternating in their conducting conditions.

The grid of the left-hand triode of the first stage is connected at 214 to the grid of triode 216 in series with which there is the coil 218 of the relay 176. The grid of the right-hand triode of the second scaling stage 212 is similarly connected to the grid of a triode 224 in series with which are a group of relay coils 226 having contacts arranged as illustrated in Figure 3. Of these, reference need only be made to the bottom relay which is provided with alternatively groundable contacts connected to the terminals 62 and 64 previously referred to and shown in Figure 2.

In order to secure advances of the first scaling stage independently of discharge of thyratron 204, there is provided a manual switch 220 which serves to provide negative scaling stage operating pulses. The purpose of this switch is merely to secure desired phase relationships in the overall operation.

Figure 4:
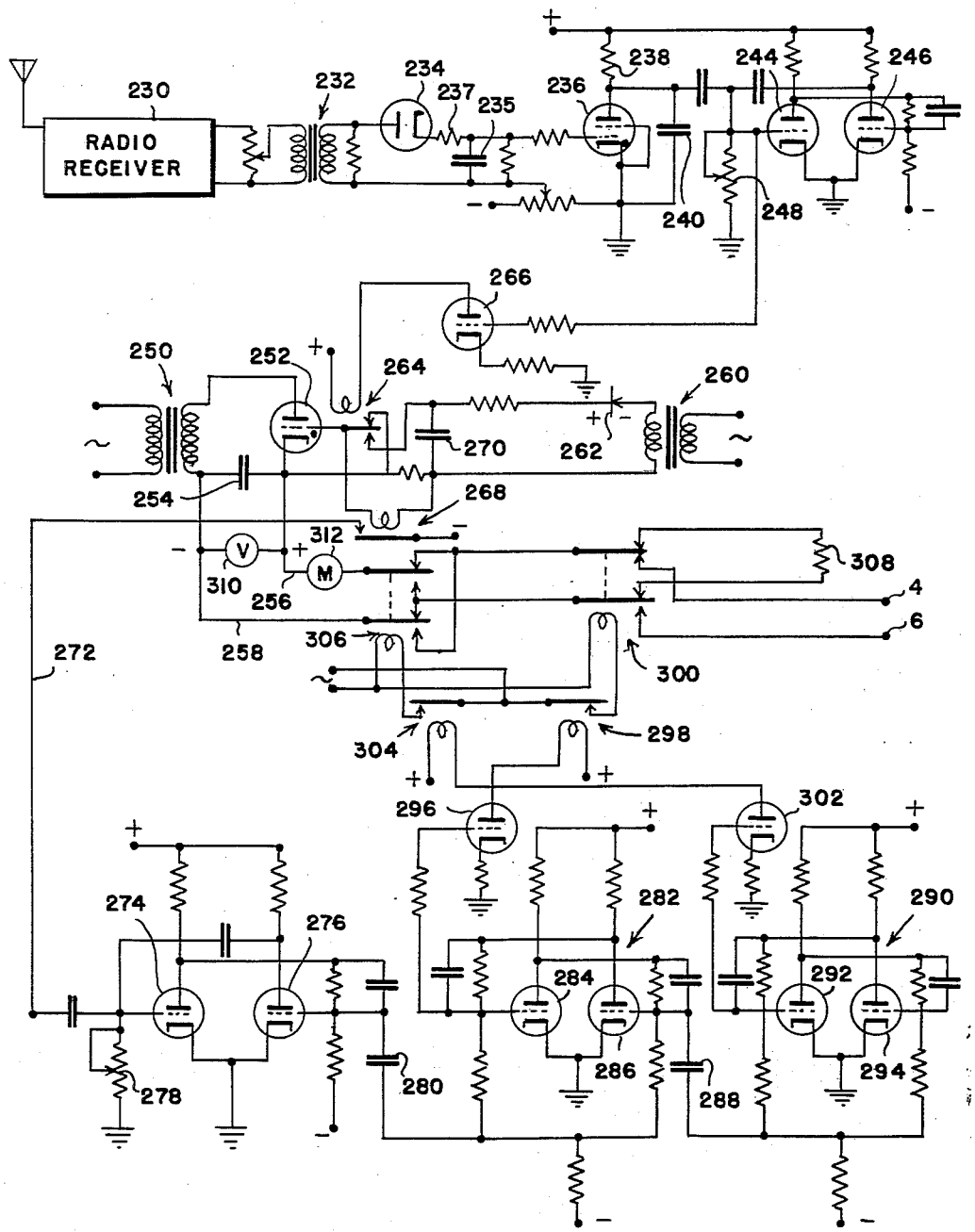
Figure 4 is a wiring diagram showing, in particular, the means for controlling the currents introduced into the earth.

Before proceeding to a detailed description of the operation of the timing mechanism, reference will be made to Figure 4 which shows the current controlling part of the apparatus. It may be remarked that in field operations it is convenient to have the apparatus carried by a pair of independent trucks, one which may be referred to as the measuring truck and the other as the power truck. The measuring truck contains the apparatus heretofore described and illustrated in Figures 1, 2 and 3. The power truck contains the apparatus illustrated in Figure 4. To secure freedom of mobility, it is desirable to avoid cable connections between the trucks and, hence, signals from the transmitter 198 of Figure 3 are arranged to be received by the receiver in the power truck which is designated 230 in Figure 4.

The signal transmitted is desirably an audio frequency modulated carrier which is demodulated in the receiver and the audio signal is transmitted through transformer 232 to the diode 234 which delivers the rectified signal to the arrangement of condenser 235 and resistance 237 providing a long time constant. A positive signal is thus delivered to the control grid of the thyratron 236, the grid of which is normally biased negatively so that the thyratron, in its circuit consisting of resistor 238 and condenser 240, would normally pulse at a very low frequency lower than that of repetition of the transmitted signals. The thyratron is thus caused to fire once for every radio transmitted signal at a predetermined interval following the onset of the signal and determined by the time constant of the circuit 235, 237.

The firing of the thyratron delivers a negative pulse to the monostable multivibrator consisting of the triodes 244 and 246 in a conventional circuit. The astable state of the multivibrator is set by the variable resistance 248, and as will shortly appear, the duration of the astable state is made sufficiently long to apply bias to thyratrons 252 during a period of load switching.

The current to be introduced into the earth through electrodes 4 and 6 is desirably supplied from an alternating source through a grid controlled thyratron rectifier. The source is diagrammed as comprising a transformer 250 which feeds the thyratron 252 to supply a rectified filtered by a condenser indicated at 254 to deliver direct current through the positive supply line 256 and negative supply line 258. While a single rectifier is shown for simplicity, desirably, a group of rectifiers of the thyratron type is provided furnished with three-phase alternating current at a relatively high frequency such as 400 cycles to secure uniformity of the direct current. In fact, a plurality of such supplies may be provided particularly where it is desired to use, at times, a plurality of current sources, as in said Pearson application. It will be understood that when a plurality of rectifiers are so operated multiphase bias voltage may be applied to their grids to interrupt the supply of current in a more elaborate fashion but one equivalent to that which will now be described.

A transformer 260 energized from the alternating current source which supplies the rectifier furnishes negative bias potential through a diode 262 and a simple filtering arrangement including the condenser 170. The bias is applied to the grid of thyratron 252 at proper times through a relay 264 which is in circuit with a triode 266 the grid of which is connected to the grid of the normally conducting triode 244 of the monostable multivibrator. During the astable state of this multivibrator, the bias is applied to cut off current flow through the thyratron. Switching of the current introduced to the earth is controlled through a relay 268 which is energized simultaneously with the application of bias to the thyratron. It is desirable that a separate relay should be used for this purpose and tied into the bias-applying circuit to insure that switching does not occur while current is being supplied to the earth. Aside from this consideration, the signal produced through the operation of relay 268 could be derived directly from the thyratron 236.

The relay 268 supplies from a negative potential terminal through the line 272 a negative pulse to a second monostable multivibrator comprising the triodes 274 and 276 in conventional circuit arrangement and provided with an adjustment of resistance at 278 to control the duration of its astable state. This multivibrator has a short astable state which is of sufficient duration, however, to insure that switching will not occur until the current has been cut off by biasing of the thyratron 252. At the end of the astable state of the multivibrator, a negative pulse is delivered through condenser 280 to advance the scaling stage indicated at 282 consisting of triodes 284 and 286 in conventional connections. This first scaling stage in turn is arranged to deliver through condenser 288 negative pulses to a second scaling stage 290 consisting of the triodes 292 and 294 conventionally connected. The result of this arrangement is that of each signal received at the radio receiver 230 the first stage will undergo operation so as to pass through a complete cycle for each two such signals received. The ssecond scaling stage in turn goes through a complete cycle for every four such signals received.

The grid of the triode 284 of the first scaling stage is connected to the grid of a triode 296 which is in circuit with a pilot relay 298 serving to control a load shifting power relay 300. Tre triode 292 of the second scaling stage has its grid connected to the grid of a triode 302 which is in the circuit of a pilot relay 304 arranged to control a power relay 306 which is of current reversing type. As will be evident from the circuit connections illustrated, the direct current supplied through lines 256 and 258 will be reversed by operations of the relay 306 and the output reversed currents from this relay will be shifted either to the ground electrodes 4 and 6 or to a dummy load resistor 308. The current reversal makes one complete cycle in each complete cycle of operation of the apparatus. The cycle of shifting between the ground electrodes and the dummy load occurs twice during each complete cycle of operation.

The overall operation of the apparatus may now be described with particular reference to Figure 5.

The first graph in Figure 5 shows the timer pulses emanating from the anode of thyratron 158. Since twenty-four of these pulses constitute a complete cycle of operation, it is evident that the variable period of these pulses determines the period of the complete cycle which may be made quite short or quite long depending upon the conditions to be investigated. In particular, if the region undergoing investigation is deep, the period may be made very long since transients having indications of deep anomalies may be expted to lag the currents introduced or interrupted giving rise to them.

The next six graphs of Figure 5 represent the conditions of the triodes in the six positions illustrated. A heavy line is intended to indicate in these graphs conductivity of the triode involved.

Consistently with the connections illustrated in Figure 3, the thyratron 204 will be fired upon intereruption of conductivity of the triode 166 in position (6). The firing of the thyratron 204 is indicated by the next graph in Figure 5.

The firing of thyratron 204 causes shifting of conductivity between the triodes in the first scaling stage 210 and corresponding conditions of conduction or non-conduction of triode 216. The alternate shifts of the scaling stage 210 produce shifting of conductivity between the triodes of the second scaling stage 212 and consequent conduction or non-conduction of triode 224. The next graphs illustrate these conditions of the scaling stages and triodes 216 and 224.

The next set of graphs indicate the energized or de-energized conditions of the terminals 196 in the six positions illustrated in Figure 3. First, it may be noted that energization of these terminals, if it occurs at all, occurs only during the period in which the triode 166 in the preceding position is energized and the triode 166 in its corresponding position is deenergized. Secondly, except in the case of the terminal 196 in position (2), energization depends upon the condition of triode 216 in relationship to the position of switch 178. Assuming switch 178 in one position, then with triode 216 energized, there will occur energization of terminals 196 as indicated by the reavy full lines in the graphs. However, if switch 178 were shifted to its alternate position, energization would then occur as indicated by the dotted lines in these graphs.

The foregoing is true except as to the terminal 196 in position (2) which energizes the radio transmitter 198. As previously indicated, the energization of this terminal 196 is derived from positive terminal 186 rather than through relay 176 and switch 178. The result is that this particular terminal is energized four times during each complete cycle of operation irrespective of the position of switch 178.

The various terminals 196 are conveniently connected to individual measuring circuits of the type illustrated in Figure 2, being connected to the terminal 60 of each such circuit, though, if measurements at individual phases only are desired at any one time, a single circuit as in Figure 2 may be provided having its terminal 60 selectively switched to the terminals 196. As indicated at the right of Figure 3, the several relays 226 have contacts connected to the terminals 62 and 64 of the various circuits illustrated in Figure 2. Assuming for purposes of explanation that the measuring circuit which is of interest corresponds to position (5) of Figure 3, its terminal 60 will be connected to terminal 196 in position (5) and its terminals 62 and 64 will be connected to one of the pairs of relay contacts so as to be selectively grounded through the operation of one of the relays 226, all of which are operated upon conductivity of triode 224. Considering Figure 2, therefore, it will be apparent that relays 56 and 58 will be selectively energized simultaneously with energization of the terminal 196 in position (5) but in dependence upon the conducting or non-conducting condition of triode 224. This operation is graphically illustrated in Figure 5, wherein a rise of the graph indicates energization of relay 56 and a drop in the graph indicates energization of relay 58. As will become apparent, the selective energizations of these relays correspond to reversals in transient conditions in the earth, with the result that the ungrounded terminals of condensers 84 and 86 are charged oppositely as previously described.

The next graph in Figure 5 merely illustrates the emanation of a signal from transmitter 198 corresponding to energization of terminal 196 in position (2) in Figure 3. This signal controls the operation of the current supply in Figure 4.

The firing of thyratron 236 occurs upon the reception of each radio signal but at a time delayed from the onset of the signal depending upon the time constant afforded by condenser 235 and resistance 237 and the setting of the control grid bias. The bias of the rectifier or rectifiers exemplified by 252 begins in each quarter cycle with the firing of thyratron 236 and continues to interrupt the supply of current for a period depending upon the astable state of the multivibrator comprising triodes 244 and 246, the period during which bias is applied being adjustable by the adjustment of resistance 248. The application of this bias should be, at least, as long as the duration of the switching operations.

The switching relay 300 is operated in correspondence with each application of rectifier bias but is delayed after the initial application of bias by the delay provided through the monostable multivibrator comprising the triodes 274 and 276, this multivibrator being thrown to its astable state immediately upon the application of bias, and then upon its returning to the stable state delivering a signal for control of the scaling stage 282 and the triode 296 and pilot relay 298 through which the power relay 300 is controlled. The cycle of the switching relay 300 is accordingly as pictured in Figure 5.

The reversing relay 306 has its complete cycle in the complete cycle of the apparatus and shift occurs corresponding to every second switch of the relay 300 due to the fact that it is controlled by the second scaling stage 290 which is actuated from the first scaling stage.

Considering the graphs for the relays 300 and 306 and the graph representing the application of rectifier bias, it will be evident that there follow the two final graphs in Figure 5 indicating, respectively, current in the earth applied through the earth electrodes 4 and 6 and current in the dummy load 308. Reversal of the current supply is accomplished through relay 306 while shifting of the current as between the earth electrodes and the dummy load is controlled by relay 300. Additionally, current flows only during the periods of absence of bias on the rectifier tube or tubes indicated at 252.

Comparing the graph representing the current in the earth and the graph representing the conditions of relays 56 and 58, it will be noted that the potential field of the earth appearing at the potential electrodes is sampled by the particular measuring apparatus in position (5) at periods bearing predetermined phase relationships to the reverse current flows in the earth. It will also be noted that the condenser to which the picked-up signal is routed by the relays depends upon the direction of the current in the earth or, effectively, the phase relationship to the reversals. It will, accordingly, be clear that measurements are made under the conditions previously described with reference to the operation of Figure 2. The sampling may occur either during periods of introduction of currents to the earth or during periods between those of current supply. In the former case measurements are made during build-up of the electrical field in the earth; in the latter case during its collapse.

Depending upon the desired operation, measuring circuits of the type illustrated in Figure 2 may be provided in five of the cyclic positions illustrated in Figure 3 or, alternatively, a single measuring apparatus may be switched to any desired one of them. Furthermore, as will be evident from the graphs relating to terminals 196, it will be seen that the positioning of switch 178 may select the cycles in which operations will be produced. Furthermore, it may be noted that by the manipulation of switch 220 shifting of phasing may be accomplished with the result that a wide variety of selected measurements may be made. Furthermore, by control of the overall length of the cycle, the various pulses of current flow in the earth may be spaced and, additionally, the lengths of these pulses may be controlled by the control of the period of application of rectifier bias.

As previously noted, the apparatus is generally applicable to various electrode configurations, to multiple current supplies, or the like. Furthermore, the measuring intervals may, if desired, be made many more than illustrated merely by the choice of a different cycling circuit than that having the six alternative conditions illustrated in Figure 3.

The major aspect of the invention involves the apparatus of Figure 2 which gives rise to a high discrimination of the desired signals to be measured against noise. It has been proposed to integrate over long periods of time signals picked up by potential electrodes, but this system is relatively ineffective due to the fact that the rather minute signals of interest are by such system involved in the integraion along with large disturbing signals. In accordance with the present system, integration of this type is not involved, but instead there is merely provided a corrective signal in accordance with deviations from equality which occur between the potentials of the condensers 84 and 86, and only these small deviations are subject to what involves integration but is effectively long time constant filtering to give rise to potentials producing a null difference. The measure of the current producing equality of the condenser potentials constitutes, therefore, a measure of the desired signals indicative of anomalies in the electrical configuration of the earth. It will be evident that various parts of the invention may be used in conjunction with other elements known in the art and substituted for those herein illustrated. It is, therefore, to be understood that the invention is not to be regarded as limited except as required by the following claims.

What is claimed is:

1. Apparaus for electrical prospecting comprising means for producing in the earth a periodically varying current field, and means for exhibiting characteristics of said field, the last means comprising a detector of the characteristic to be exhibited providing a periodic output corresponding to such characteristics, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, and means for measuring the last mentioned input.

2. Apparatus for electrical prospecting comprising means for producing in the earth a periodically varying current field, and means for exhibiting characteristics of said field, the last means comprising a detector of the characteristics to be exhibited providing a periodic output corresponding to such characteristics, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means having an effective filtering action to provide a slowly varying input, and means for measuring the last mentioned input.

3. Apparatus for electrical prospecting comprising means for producing in the earth a periodically varying current field, and means for exhibiting characteristics of said field, the last means comprising a detector of the characteristics to be exhibited providing a periodic output corresponding to such characteristics, means for sampling said output at a predetermined phase of each of a group of successive cycles of the output and providing currents to a pair of condensers to accumulate a potential difference at terminals thereof constituting a measure of the output samples, means responsive to said potential difference and providing an input to at least one of said terminals to produce approximately a predetermined potential difference between said terminals, and means for measuring the last mentioned input.

4. Apparatus for electrical prospecting comprising means for producing in the earth a periodically varying current field, and means for exhibiting characteristics of said field, the last means comprising a detector of the characteristics to be exhibited providing a periodic output corresponding to such characteristics, means for sampling said output at a predetermined phase of each of a group of successive cycles of the output and providing currents to a pair of condensers to accumulate a potential difference at terminals thereof constituting a measure of the output samples, means responsive to said potential difference and providing an input to at least one of said terminals to produce approximately a predetermined potential difference between said terminals, the last mentioned means having an effective filtering action to provide a slowly varying input, and means for measuring the last mentioned input.

5. Apparatus for electrical prospecting comprising means for producing in the earth a periodically varying current field, and means for exhibiting characteristics of said field, the last means comprising a detector of the characteristics to be exhibited providing a periodic output corresponding to such characteristics, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means comprising synchronous rectifying means and an integrator receiving the output of said rectifying means to provide a slowly varying input, and means for measuring the last mentioned input.

6. Apparatus for electrical prospecting comprising means for producing in the earth a periodically varying current field, and means for exhibiting characteristics of said field, the last means comprising a detector of the characteristics to be exhibited providing a periodic output corresponding to such characteristics, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means comprising synchronous amplifying and rectifying means and an integrator receiving the output of said rectifying means to provide a slowly varying input, and means for measuring the last mentioned input.

7. Apparatus for electrical prospecting comprising means for producing in the earth a periodically varying current field, and means for exhibiting characteristics of said field, the last means comprising a detector of the characteristics to be exhibited providing a periodic output corresponding to such characteristics, means for sampling said output at a predetermined phase of each of a group of successive cycles of the output and providing currents to a pair of condensers to accumulate a potential difference at terminals thereof constituting a measure of the output samples, means responsive to said potential difference and providing an input to at least one of said terminals to produce approximately a predetermined potential difference between said terminals, the last mentioned means comprising synchronous rectifying means and an integrator receiving the output of said rectifying means to provide a slowly varying input, and means for measuring the last mentioned input.

8. Apparatus for electrical prospecting comprising means for producing in the earth a periodically varying current field, and means for exhibiting characteristics of said field, the last means comprising a detector of the characteristics to be exhibited providing a periodic output corresponding to such characteristics, means for sampling said output at a predetermined phase of each of a group of successive cycles of the output and providing currents to a pair of condensers to accumulate a potential difference at terminals thereof constituting a measure of the output samples, means responsive to said potential difference and providing an input to at least one of said terminals to produce approximately a predetermined potential difference between said terminals, the last mentioned means comprising synchronous amplifying and rectifying means and an integrator receiving the output of said rectifying means to provide a slowly varying input, and means for measuring the last mentioned input.

9. Apparatus for electrical prospecting comprising means for producing in the earth a periodically varying current field, and means for exhibiting characteristics of said field, the last means comprising electrodes in contact with the earth and providing a periodic output corresponding to such characteristics, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, and means for measuring the last mentioned input.

10. Apparatus for electrical prospecting comprising means for producing in the earth a periodically varying current field, and means for exhibiting characteristics of said field, the last means comprising electrodes in contact with the earth and providing a periodic output corresponding to such characteristics, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means having an effective filtering action to provide a slowly varying input, and means for measuring the last mentioned input.

11. Apparatus for electrical prospecting comprising means for producing in the earth a periodically varying current field, and means for exhibiting characteristics of said field, the last means comprising electrodes in contact with the earth and providing a periodic output corresponding to such characteristics, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means comprising synchronous rectifying means and an integrator receiving the output of said rectifying means to provide a slowly varying input, and means for measuring the last mentioned input.

12. Apparatus for electrical prospecting comprising means for producing in the earth a periodically varying current field, and means for exhibiting characteristics of said field, the last means comprising electrodes in contact with the earth and providing a periodic output corresponding to such characteristics, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means comprising synchronous amplifying and rectifying means and an integrator receiving the output of said rectifying means to provide a slowly varying input, and means for measuring the last mentioned input.

13. Apparatus for electrical prospecting comprising means for producing in the earth a periodically reversed current field, and means for exhibiting characteristics of said field, the last means comprising electrodes in contact with the earth and providing a periodic output corresponding to such characteristics in synchronism with said current field, a pair of condensers, means sampling said output at a predetermined phase of each of the half periods of said input and providing an input to one of said condensers in one half period and to the other of said condensers in the other half period of each complete period, means responsive to the difference of potential of said condensers to provide an input to at least one of said condensers to produce approximately a predetermined potential difference between them, and means for measuring the last mentioned input.

14. Apparatus for electrical prospecting comprising means for producing in the earth a periodically reversed current field, and means for exhibiting characteristics of said field, the last means comprising electrodes in contact with the earth and providing a periodic output corresponding to such characteristics in synchronism with said current field, a pair of condensers, means sampling said output at a predetermined phase of each of the half periods of said output and providing an input to one of said condensers in one half period and to the other of said condensers in the other half period of each complete period, means responsive to the difference of potential of said condensers to provide an input to at least one of said condensers to produce approximately a predetermined potential difference between them, the last mentioned means having an effective filtering action to provide a slowly varying input, and means for measuring the last mentioned input.

15. Apparatus for electrical prospecting comprising means for producing in the earth a periodically reversed current field, and means for exhibiting characteristics of said field, the last means comprising electrodes in contact with the earth and providing a periodic output corresponding to such characteristics in synchronism with said current field, a pair of condensers, means sampling said output at a predetermined phase of each of the half periods of said output and providing an input to one of said condensers in one half period and to the other of said condensers in the other half period of each complete period, means responsive to the difference of potential of said condensers to provide an input to at least one of said condensers to produce approximately a predetermined potential difference between them, the last mentioned means comprising a chopper for converting said potential difference into an alternating signal, amplifying means for said signal, synchronous rectifying means for the amplified signal, said rectifying means being synchronous with said chopper, and integrating means receiving the output of said rectifying means and providing said input, and means for measuring the last mentioned input.

16. Apparatus for electrical prospecting comprising means for producing in the earth a periodically reversed current field, and means for exhibiting characteristics of said field, the last means comprising a central electrode and a pair of electrodes symmetrically disposed on opposite sides of said central electrode, all of said electrodes being in contact with the earth, means for summing algebraically the potentials of the electrodes of said pair with respect to said central electrode and providing a periodic output corresponding to such characteristics in synchronism with said current field, a pair of condensers, means sampling said output at a predetermined phase of each of the half periods of said output and providing an input to one of said condensers in one half period and to the other of said condensers in the other half period of each complete period, means responsive to the difference of potential of said condensers to provide an input to at least one of said condensers to produce approximately a predetermined potential difference between them, and means for measuring the last mentioned input.

17. Apparatus for electrical prospecting comprising means for producing in the earth a periodically reversed current field, and means for exhibiting characteristics of said field, the last means comprising a central electrode and a pair of electrodes symmetrically disposed on opposite sides of said central electrode, all of said electrodes being in contact with the earth, means for summing algebraically the potentials of the electrodes of said pair with respect to said central electrode and providing a periodic output corresponding to such characteristics in synchronism with said current field, a pair of condensers, means sampling said output at a predetermined phase of each of the half periods of said output and providing an input to one of said condensers in one half period and to the other of said condensers in the other half period of each complete period, means responsive to the difference of potential of said condensers to provide an input to at least one of said condensers to produce approximately a predetermined potential difference between them, the last mentioned means having an effective filtering action to provide a slowly varying input, and means for measuring the last mentioned input.

18. Apparatus for electrical prospecting comprising means for producing in the earth a periodically reversed current field, and means for exhibiting characteristics of said field, the last means comprising a central electrode and a pair of electrodes symmetrically disposed on opposite sides of said central electrode, all of said electrodes being in contact with the earth, means for summing algebraically the potentials of the electrodes of said pair with respect to said central electrode and providing a periodic output corresponding to such characteristics in synchronism with said current field, a pair of condensers, means sampling said output at a predetermined phase of each of the half periods of said output and providing an input to one of said condensers in one half period of each complete period, means responsive to the difference of potential of said condensers to provide an input to at least one of said condensers to produce approximately a predetermined potential difference between them, the last mentioned means comprising a chopper for converting said potential difference into an alternating signal, amplifying means for said signal, synchronous rectifying means for the amplified signal, said rectifying means being synchronous with said chopper, and integrating means receiving the output of said rectifying means and providing said input, and means for measuring the last mentioned input.

19. Apparatus for electrical prospecting comprising means for producing in the earth a periodically reversed current field, and means for exhibiting characteristics of said field, the last means comprising a central electrode and a pair of electrodes symmetrically disposed on opposite sides of said central electrode, all of said electrodes being in contact with the earth, means for summing algebraically the potentials of the electrodes of said pair with respect to said central electrode and providing a periodic output corresponding to such characteristics in synchronism with said current field, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, and means for measuring the last mentioned input.

20. Apparatus for electrical prospecting comprising means for producing in the earth a periodically reversed current field, and means for exhibiting characteristics of said field, the last means comprising a central electrode and a pair of electrodes symmetrically disposed on opposite sides of said central electrode, all of said electrodes being in contact with the earth, means for summing algebraically the potentials of the electrodes of said pair with respect to said central electrode and providing a periodic output corresponding to such characteristics in synchronism with said current field, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means having an effective filtering action to provide a slowly varying input, and means for measuring the last mentioned input.

21. Apparatus for electrical prospecting comprising means for producing in the earth a periodically reversed current field, and means for exhibiting characteristics of said field, the last means comprising a central electrode and a pair of electrodes symmetrically disposed on opposite sides of said central electrode, all of said electrodes being in contact with the earth, means for summing algebraically the potentials of the electrodes of said pair with respect to said central electrode and providing a periodic output corresponding to such characteristics in synchronism with said current field, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means comprising synchronous rectifying means and an integrator receiving the output of said rectifying means to provide a slowly varying input, and means for measuring the last mentioned input.

22. Apparatus for electrical prospecting comprising means for producing in the earth a periodically reversed current field, and means for exhibiting characteristics of said field, the last means comprising a central electrode and a pair of electrodes symmetrically disposed on opposite sides of said central electrode, all of said electrodes being in contact with the earth, means for summing algebraically the potentials of the electrodes of said pair with respect to said central electrode and providing a periodic output corresponding to such caharacteristics in synchronism with said current field, means for sampling said output at a predetermined phase of each of a group of successive cycles of the output and providing a potential difference to a pair of terminals constituting a measure of the output samples, means responsive to said potential difference and providing an input to at least one of said terminals to produce approximately a predetermined potential difference between said terminals, the last mentioned means comprising synchronous amplifying and rectifying means and an integrator receiving the output of said rectifying means to provide a slowly varying input, and means for measuring the last mentioned input.

23. Apparatus for electrical prospecting comprising means for producing in the earth a periodically varying current field including control devices for establishing periods of said field, means for exhibiting characteristics of said field, the last means comprising a detector of the characteristics to be exhibited providing a periodic output corresponding to such characteristics, means for sampling said output at a predetermined phase of each of a group of successive cycles of the output including a control device for establishing phases of said sampling, and radio communication means for synchronizing said two control devices.

24. Apparatus for electrical prospecting comprising means for producing in the earth a periodically varying current field including control devices for establishing periods of said field, means for exhibiting characteristics of said field, the last means comprising a detector of the characteristics to be exhibited providing a periodic output corresponding to such characteristics, means for sampling said output at a predetermined phase of each of a group of successive cycles of the output including a control device for establishing phases of said sampling, one of said control devices generating spaced timing pulses, and radio communication means controlled by said timing pulses and effecting synchronism of the other of said control devices wtih the control device generating said timing pulses.

25. Apparatus for electrical prospecting comprising means for producing in the earth a periodically varying current field including control devices for establishing periods of said field, means for exhibiting characteristics of said field, the last means comprising a detector of the characteristics to be exhibited providing a periodic output corresponding to such characteristic, means for sampling said output at a predetermined phase of each of a group of successive cycles of the output including a control device for establishing phases of said sampling, the last mentioned control device generating spaced timing pulses determined times of sampling, and means controlled by predetermined ones of said timing pulses for effecting synchronism of the first mentioned control device with said last mentioned control device.

26. Apparatus for electrical prospecting comprising means for producing in the earth a periodically varying current field including control devices for establishing periods of said field, means for exhibiting characteristics of said field, the last means comprising a detector of the characteristics to be exhibited providing a periodic output corresponding to such characteristics, means for sampling said output at a predetermined phase of each of a group of successive cycles of the output including a control device for establishing phases of said sampling, the last mentioned control device generating spaced timing pulses determining times of sampling, and radio communication means controlled by predetermined ones of said timing pulses for effecting synchronism of the first mentioned control device with said last mentioned control device.

References Cited in the file of this patent

UNITED STATES PATENTS

| | | |
|---|---|---|
| Re. 24,464 | Yost | Apr. 22, 1958 |
| 2,343,140 | Evjen | Feb. 29, 1944 |
| 2,363,987 | Muzzey | Nov. 28, 1944 |
| 2,608,602 | Muffly | Aug. 26, 1952 |
| 2,619,520 | Nichols | Nov. 25, 1952 |
| 2,712,627 | Doll | July 5, 1955 |